(12) United States Patent
Yu et al.

(10) Patent No.: US 12,422,631 B2
(45) Date of Patent: Sep. 23, 2025

(54) TRANSMITTER OPTICAL SUB-ASSEMBLY STRUCTURE AND ACTIVE ALIGNMENT METHOD THEREOF

(71) Applicant: Cloud Light Technology Limited, Hong Kong (HK)

(72) Inventors: Yvonne Xiaoming Yu, Hong Kong (HK); Hau Chen Loke, Penang (MY); Paladin Li Peng Cai, Hong Kong (HK); Wing Keung Mark Mak, Hong Kong (HK); Vincent Wai Hung, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 0 days.

(21) Appl. No.: 17/879,774

(22) Filed: Aug. 3, 2022

(65) Prior Publication Data

US 2024/0045157 A1 Feb. 8, 2024

(51) Int. Cl.
*G02B 6/42* (2006.01)
*H04B 10/50* (2013.01)

(52) U.S. Cl.
CPC ............ *G02B 6/4227* (2013.01); *G02B 6/42* (2013.01); *G02B 6/4208* (2013.01); *G02B 6/4268* (2013.01); *H04B 10/503* (2013.01)

(58) Field of Classification Search
CPC ... G02B 6/4201; G02B 6/4269; G02B 6/4268
See application file for complete search history.

(56) References Cited

U.S. PATENT DOCUMENTS

| | | | |
|---|---|---|---|
| 2003/0161593 A1* | 8/2003 | Stackhouse | G02B 6/4277 385/92 |
| 2003/0174454 A1* | 9/2003 | Fu | G02B 6/4273 361/103 |
| 2004/0005119 A1* | 1/2004 | Han | G02B 6/421 385/49 |
| 2008/0187325 A1* | 8/2008 | McCallion | G02B 6/4201 398/192 |
| 2010/0091804 A1* | 4/2010 | Musio | H01S 5/141 372/20 |
| 2015/0125162 A1* | 5/2015 | Pfnuer | H01S 5/023 398/201 |
| 2017/0269311 A1* | 9/2017 | Wang | G02B 6/4204 |

(Continued)

*Primary Examiner* — Eric Wong
(74) *Attorney, Agent, or Firm* — Harrity & Harrity, LLP (57) ABSTRACT

Structures and active alignment methods thereof of a Transmitter Optical Sub-Assembly (TOSA) Structure are provided, that includes a light source sub-assembly including a light source component assembled on a light source bench; an optical sub-assembly including an optical component assembled on an optical bench; and a silicon chip including a coupler. A light emitted by the light source component is received by the coupler via the optical component along an optical path, the light source bench and the optical bench are thermally conductive to dissipate heat. The light source sub-assembly and the optical sub-assembly are actively aligned at the same time to optimize optical coupling between the light source sub-assembly and the optical sub-assembly by optimizing positions and a distance of the light source sub-assembly and the optical sub-assembly, the positions and the distance are flexibly adjusted during the active alignment process.

20 Claims, 10 Drawing Sheets

(56) References Cited

U.S. PATENT DOCUMENTS

| 2018/0331493 | A1* | 11/2018 | Lin | H01S 5/0234 |
| 2020/0012055 | A1* | 1/2020 | Ye | H04J 14/0256 |
| 2020/0241222 | A1* | 7/2020 | Wang | G02B 6/4226 |
| 2020/0319415 | A1* | 10/2020 | Hung | G02B 6/4245 |

* cited by examiner

TRANSMITTER OPTICAL SUB-ASSEMBLY STRUCTURE AND ACTIVE ALIGNMENT METHOD THEREOF

TECHNICAL FIELD

The present disclosure is generally related to optical communications. More particularly, the present disclosure relates to a transmitter optical sub-assembly structure and an active alignment method thereof.

BACKGROUND

In the optical communication field, the major function of light delivery module converts electrical signals to light signals, and light signals are converted to a kind of module of electric signals again.

In the era of information, the rapidly increasing adoption of cloud computing, artificial intelligence and 5G mobile applications has resulted in ever-increasing reliance on robust and ultra-high-speed communication and data center infrastructure. The optical fiber communication technologies play a vital role in the rapid advance of such infrastructure. To cope with the increase in data rate and interconnect density, per-lane data rate for optical transceivers increases from 25 Gbps to 100 Gbps and beyond. At the same time, the optical modulation formats migrate from non-return-to-zero (NRZ) to 4-level pulse amplitude modulation (PAM-4) and coherent modulation, while the transmission medium transitions from parallel transmission (PSM) to wavelength division multiplexing (WDM). Under such rapid technology evolution, silicon photonics integrated circuit with its ability to enable ultra-high-speed modulator and high-density integrated optics is proven to be the ideal solution for optical transceiver design.

The silicon photonic optical transceiver typically requires a high-power continuous wave (CW) laser diode (LD) as the optical source for modulation. Such CW laser sources can be fabricated onto silicon photonics wafers using hybrid integration techniques. However, it suffers from quality issues due to burn-in yield loss.

Another approach is to have a high-power external CW laser co-packaged with the PIC to form a complete transmitter optical sub-assembly (TOSA). In particular, the CW LD is assembled on top of a LD sub-mount which is placed directly on the PIC. Some optical components precisely placed in front of the LD light path are used to focus the beam and steer it to couple into the waveguide on the PIC through a grating coupler (GC).

One major disadvantage of the TOSA in prior art technologies, is the high relative placement accuracy between multiple micro-optical components, waveguide on the PIC and the laser diode. And, the active alignment process is used to precisely place each of the optical components and laser diode to achieve the required coupling efficiency of optical power from the CW laser into the waveguide on the PIC via the grating coupler. Moreover, the performing active alignment on multiple optical components on the PIC is an extremely challenging process leading to very low process yield.

Another disadvantage is the management of heat generated from the CW laser diode during operation. And to maximize transmission data rate, each PIC would normally have multiple high-speed optical channels, requiring multiple CW lasers to be co-packaged on top of the small area on the PIC to provide the required optical power and generating a significant amount of heat from these CW laser assemblies. All the generated heat can only be dissipated to the heat sink through a long thermal path via the laser sub-mount, the PIC and the PIC sub-mount. Further, the bonding interfaces between each of the components also add to the thermal resistance leading to heat accumulation near the PIC resulting in elevated laser diode temperature, lower output power due to thermal roll-off and most importantly, short laser lifetime.

SUMMARY

The present disclosure provides a TOSA structure and an active alignment method thereof in optical communications that includes two individual sub-assembly, one is a light source sub-assembly and the other is an optical sub-assembly, where both the sub-assemblies are active aligned on the same silicon chip or beside the chip, or individually on a silicon chip and an electrical substrate.

The present disclosure provides a TOSA structure and an active alignment method thereof in optical communications which makes the active alignment method more flexible and better compatible with different designs.

It is an object of the present disclosure to better thermal transitions by providing heat dissipation path for dissipating heat in the same direction of the sub-assembly, where the heat can be dissipated either through the electrical substrate or the silicon chip, individually or together.

The present disclosure provides a good solution of assembling two pieces, including a light source sub-assembly and an optical sub-assembly, which promises the high tolerances be compensated by an active alignment method.

An aspect of the present disclosure provides a transmitter optical sub-assembly structure, including: a light source sub-assembly including a light source bench and a light source component assembled on the light source bench; an optical sub-assembly including an optical bench and an optical component assembled on the optical bench; and a silicon chip including a coupler. A light emitted by the light source component is received by the coupler via the optical component along an optical path; the light source bench and the optical bench are thermally conductive to dissipate, individually or together, heat generated from the light source component; and the light source sub-assembly and the optical sub-assembly are configured to be actively aligned, at the same time, in an active alignment process, to optimize optical coupling between the light source sub-assembly and the optical sub-assembly by optimizing positions and a distance of the light source sub-assembly and the optical sub-assembly with respect to each other, the positions and the distance of the light source sub-assembly and the optical sub-assembly are flexibly adjusted during the active alignment process.

In some embodiments, the light source sub-assembly and the optical sub-assembly are both positioned beside the chip. Furthermore, the light source sub-assembly, the optical sub-assembly, and the chip may be all assembled on an electrical substrate. The light source component may include a laser diode emitting the light, and a laser diode lens positioned at a downstream of the laser diode along the optical path, and the optical component may include an isolator.

In some embodiments, the light source sub-assembly and the optical sub-assembly are both assembled on the chip. Alternatively, the optical sub-assembly is assembled on the chip, the light source sub-assembly is assembled on an electrical substrate, and the substrate on which the light source sub-assembly is assembled is positioned beside the chip on which the optical sub-assembly is assembled. Alternatively, the optical sub-assembly is assembled on the chip, and the chip on which the optical sub-assembly is assembled and the light source sub-assembly are assembled on an electrical substrate.

In some embodiments, the chip is assembled in a cavity of the substrate or on a step of the substrate. In some embodiments, the coupler is a grating coupler or an edge coupler. In some embodiments, the light source component includes a laser diode emitting the light and a laser diode lens positioned at a downstream of the laser diode along the optical path, and the optical component includes an isolator and a prism positioned at a downstream of the isolator along the optical path.

Another aspect of the present disclosure provides an active alignment method of a transmitter optical sub-assembly structure, including: forming a light source sub-assembly including a light source bench and a light source component assembled on the light source bench; forming an optical sub-assembly including an optical bench and an optical component assembled on the optical bench; the light source bench and the optical bench being thermally conductive to dissipate, individually or together, heat generated from the light source component; providing a silicon chip including a coupler, a light emitted by the light source component is received by the coupler via the optical component along an optical path; and actively aligning the light source sub-assembly and the optical sub-assembly, at the same time, in an active alignment process, to optimize optical coupling between the light source sub-assembly and the optical sub-assembly by optimizing positions and a distance of the light source sub-assembly and the optical sub-assembly with respect to each other, the positions and the distance of the light source sub-assembly and the optical sub-assembly are flexibly adjusted during the active alignment process.

BRIEF DESCRIPTION OF DRAWINGS

For a better understanding of the embodiments of the systems and methods described herein, and to show more clearly how they may be carried into effect, references will now be made, by way of example, to the accompanying drawings, wherein like reference numerals represent like elements/components throughout and wherein.

DETAILED DESCRIPTION

The present disclosure describes the subject matter for patenting with specificity to meet statutory requirements. However, the description itself is not intended to limit the scope of this patent. The principles described herein may be embodied in many different forms.

Illustrative embodiments of the disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

The present disclosure provides structures and active alignment methods thereof of a Transmitter Optical Sub-Assembly (TOSA) Structure, that includes two sub-assembly including a light source sub-assembly and an optical sub-assembly, the light source sub-assembly includes the light source components, and the optical sub-assembly includes optical components. Both the light source and the optical subassemblies can either be assembled together on one single silicon chip which has one surface for two subassemblies active aligning together, or the light source and the optical subassemblies are assembled separately; optical sub-assembly is assembled on a silicon chip, which has optical waveguide for light transmission path, and the light source sub-assembly is assembled on an individual electrical substrate. The light source sub-assembly and optical sub-assembly are active aligned on top of the same silicon chip, or individually on top of silicon chip and electrical substrate, which gives more flexibility on assembly method. And the thermal transition can be covered by the electrical substrate or the silicon chip, individually or together.

The two sub-assemblies are assembled with thermal transition on the same direction of the sub-assemblies, which makes the active alignment methods more flexible (on the same silicon chip or on one silicon chip and an electrical substrate individually), and the active aligning process is better compatible with different designs.

Referring to FIGS. 1-15, according to some embodiments of the present disclosure, a transmitter optical sub-assembly structure is provided, including: a light source sub-assembly including a light source bench and a light source component assembled on the light source bench; an optical sub-assembly including an optical bench and an optical component assembled on the optical bench; and a silicon chip including a coupler. A light emitted by the light source component is received by the coupler via the optical component along an optical path; the light source bench and the optical bench are thermally conductive to dissipate, individually or together, heat generated from the light source component; and the light source sub-assembly and the optical sub-assembly are configured to be actively aligned, at the same time, in an active alignment process, to optimize optical coupling between the light source sub-assembly and the optical sub-assembly by optimizing positions and a distance of the light source sub-assembly and the optical sub-assembly with respect to each other, the positions and the distance of the light source sub-assembly and the optical sub-assembly are flexibly adjusted during the active alignment process. As shown in FIGS. 1-5, an assembly of a TOSA structure 100 includes a light source sub-assembly 102 and an optical sub-assembly 104. The light source sub-assembly 102 includes the light source components that may include and not limited to a laser diode 106 emitting a light, a laser diode lens 108 positioned in front of the laser diode 106 (i.e., at a downstream of the laser diode 106 along the optical path). The laser diode 106 with the laser diode lens 108 is assembled on a light source bench 110. This constitutes as first independent sub-assembly of the TOSA structure 100. The optical sub-assembly 104 includes the optical components assembled on an optical bench 112, the optical components may include and not limited to an isolator 114, and a prism 116 assembled on the optical bench 112 (at a downstream of the isolator 114 along the optical path). The optical sub-assembly 104 is assembled with particular distance defined from the light source sub-assembly 102; and then assembled as second independent sub-assembly of the TOSA structure 100. The optical bench 112 and the light source bench 110 are thermal conductive friendly, and helps in dissipating heat generated from the laser diode 106. The thermal energy generated when the laser diode 106 is on is passed directly through the light source bench 110, and also to the optical bench 112 (e.g., silicon in this case) towards the direction of the light source sub-assembly 102 and the optical sub-assembly 104.

Figure 1:
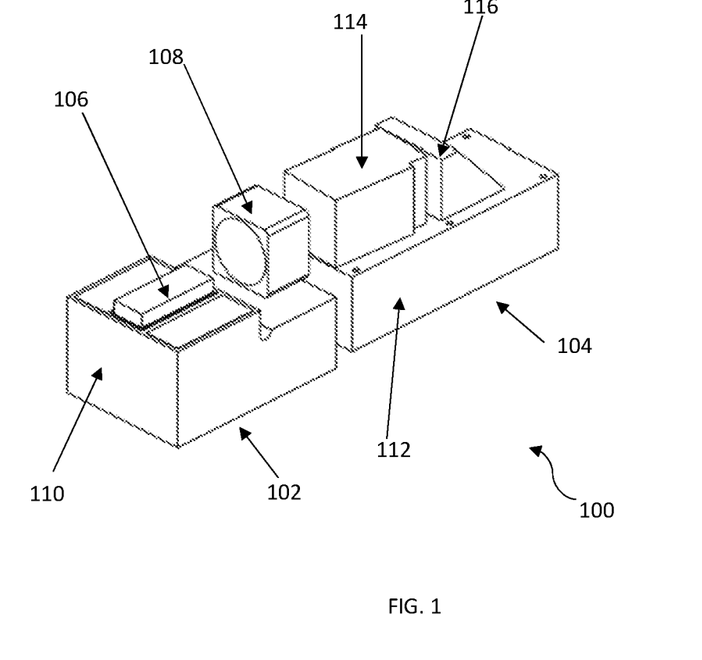
FIGS. 1-3 illustrate a perspective view, a top view, and a bottom view of a Transmitter Optical Sub-Assembly (may be abbreviated as "TOSA"), in accordance with an embodiment of the present disclosure.
Figure 2:
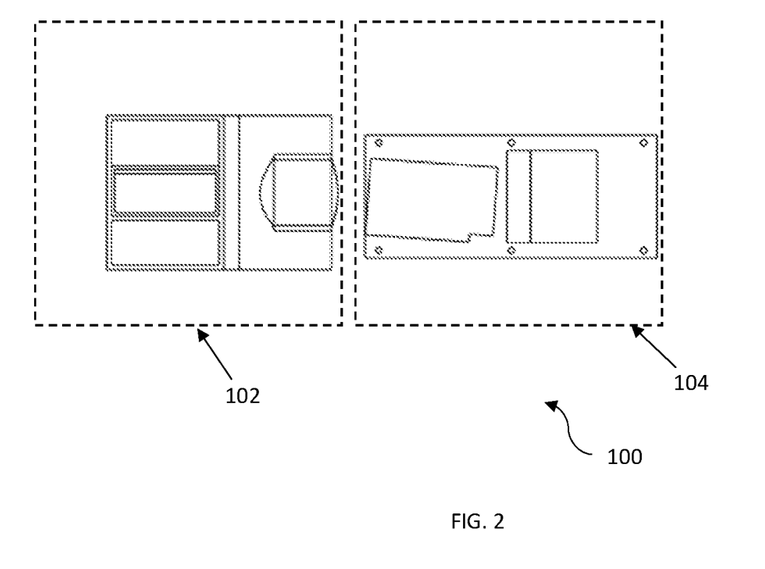
Figure 3:
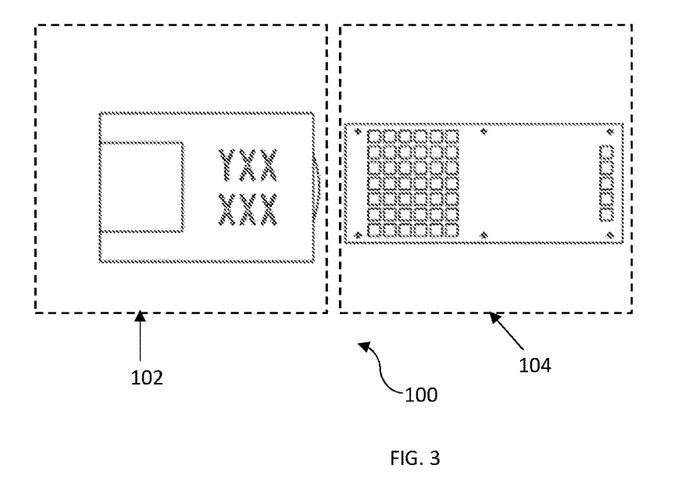
Figure 4:
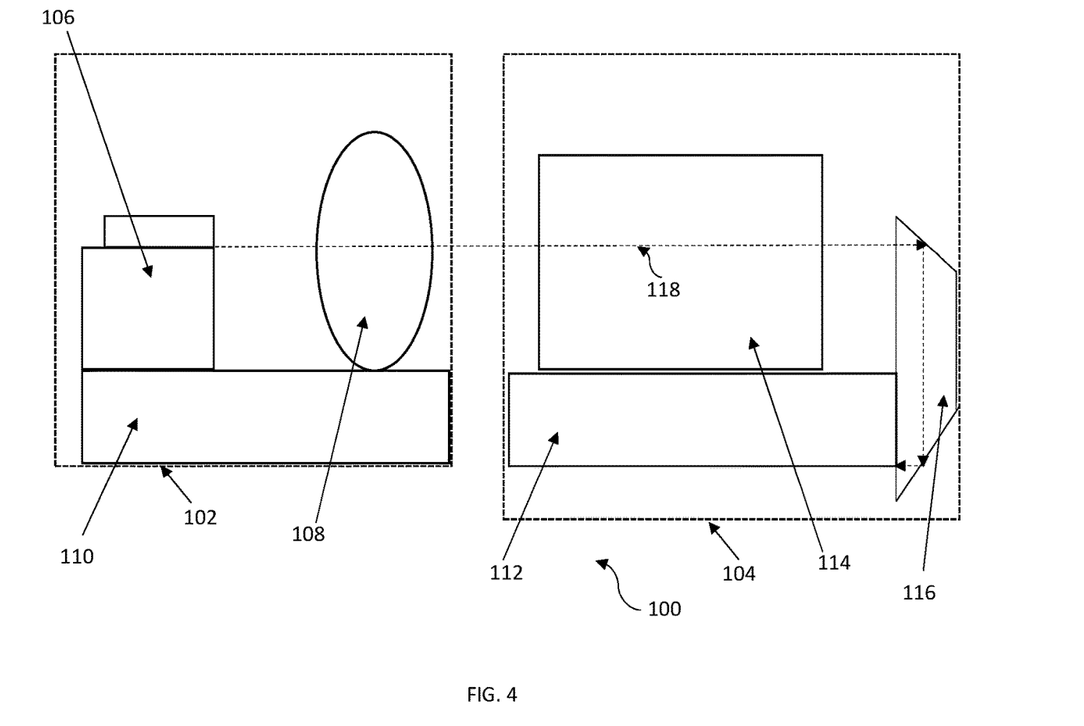
FIG. 4 illustrates a side view of a TOSA, in accordance with another embodiment of the present disclosure.
Figure 5:
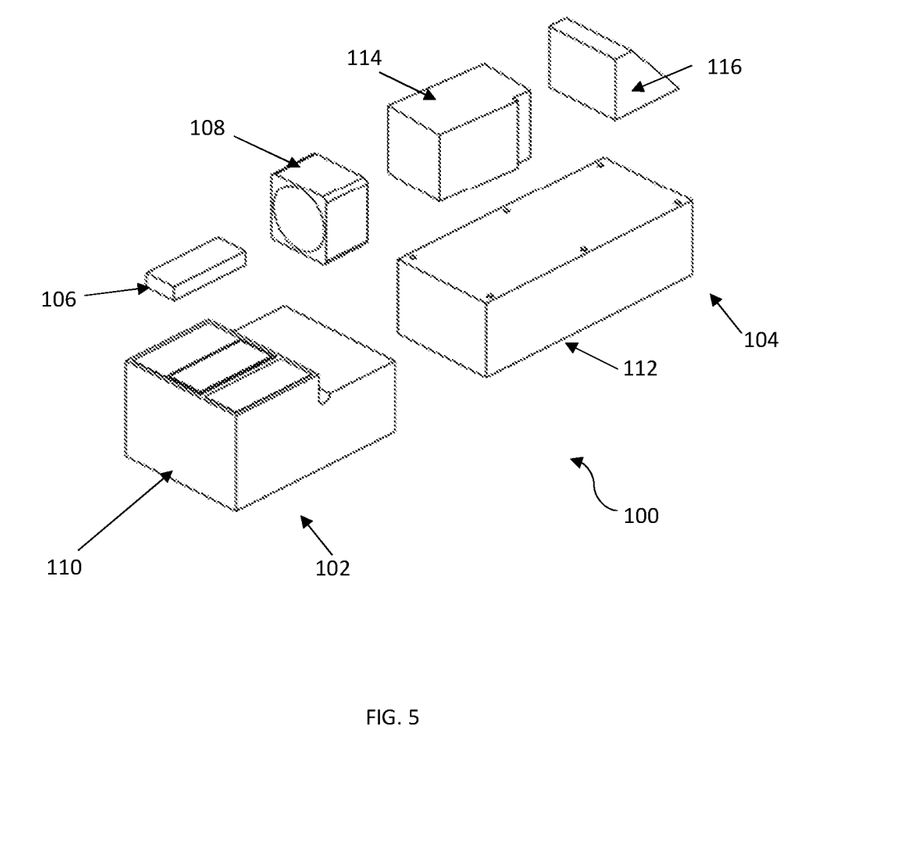
FIG. 5 illustrates an exploded view of the TOSA in FIGS. 1-3, in accordance with an embodiment of the present disclosure.

The laser diode 106 in the light source sub-assembly 102 is operably configured to actively align into an optical path 118 for optical power coupling with the optical bench 112 as illustrated in FIG. 4. In particular, the laser diode 106 is actively aligned with the optical path 118 by lighting the laser diode 106 and monitoring the optical output power received by the optical bench 112.

The light source sub-assembly 102 and the optical sub-assembly 104 of the TOSA structure 100 can be assembled together by finding the best efficiency of the optical coupling while optimizing the positions of the light source sub-assembly 102 and the optical sub-assembly 104 at the same time. The light source sub-assembly 102 and the optical sub-assembly 104 are assembled together on a silicon chip (or wafer), or assembled together beside a silicon chip depending on the fiber-to-chip optical coupling included in the TOSA structure. The fiber-to-chip optical coupling may include and not limited to grating coupler or edge coupler on silicon wafer. Grating couplers work under the off-plane coupling, while edge couplers function as in-plane coupling. Further, in an embodiment, the light source sub-assembly 102 and the optical sub-assembly 104 of the TOSA structure 100 can be assembled separately on an electrical substrate 100 (e.g., a PCB) and a silicon chip (or wafer), respectively. In another embodiment, the optical sub-assembly 104 can be embedded inside a cavity of the electrical substrate (as mentioned hereafter). In another embodiment, the optical sub-assembly 104 with the silicon wafer or silicon chip can be embedded inside the cavity of the electrical substrate. Further, in an embodiment, the light source sub-assembly 102 and the optical sub-assembly 104 of the TOSA structure 100 can both be assembled beside a silicon chip, and then the whole assembly can be assembled on the electric substrate.

In all the above different design structures of the TOSA structure 100, the TOSA structure 100 includes two sub-assemblies, the light source sub-assembly 102 and the optical sub-assembly 104, and the silicon chip may or may not be assembled with the fiber-to-chip optical coupling.

Such different structures and embodiments of the TOSA structure 100 are shown in the FIGS. 6-15.

Figure 6:
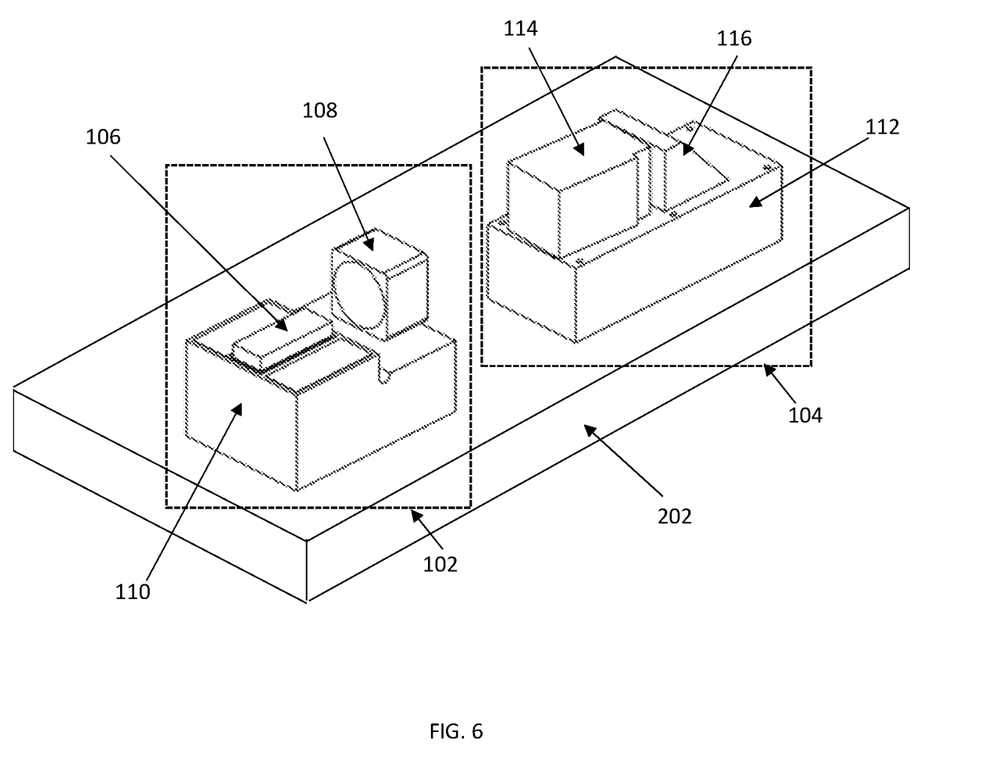
FIG. 6 illustrates an assembly of a TOSA structure including a light source sub-assembly and an optical sub-assembly, where both the light source sub-assembly and the optical sub-assembly are assembled on a silicon chip, in accordance with an embodiment of the present disclosure.
Figure 7:
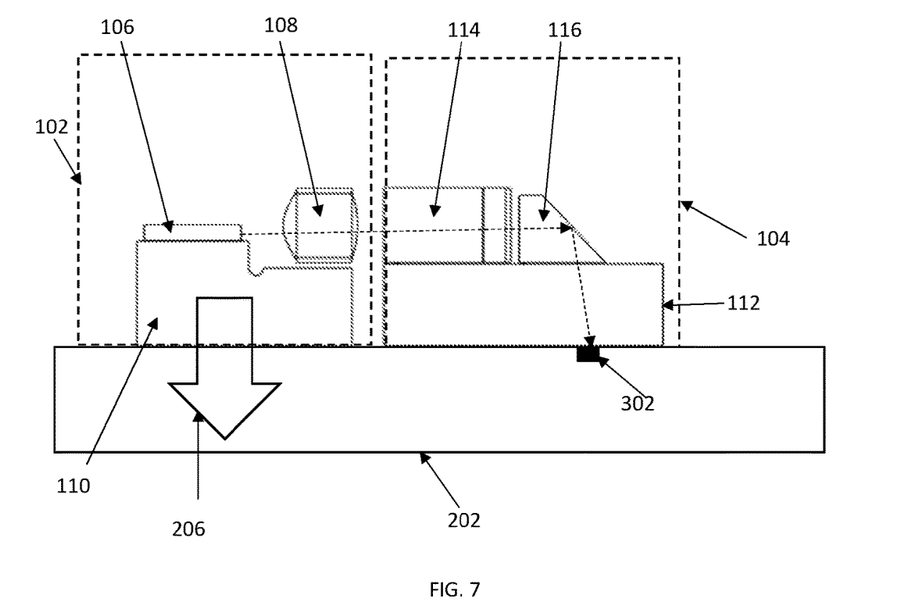
FIG. 7 illustrates a side view of the assembly in FIG. 6, with a grating coupler on the silicon chip, in accordance with an embodiment of the present disclosure.

For example, FIG. 6 illustrates a perspective view of an assembly of the Transmitter Optical Sub-Assembly (TOSA) Structure 100, where both the light source sub-assembly 102 and the optical sub-assembly 104 are assembled on a silicon chip 202. Further, FIG. 7 illustrates a side view of the assembly in FIG. 6. In an embodiment, the TOSA structure 100 may include a grating coupler 302 on the silicon chip 202, as shown in FIG. 7. The thermal energy produced at the laser diode 106 of the light source sub-assembly 102 is dissipated through the silicon chip 202, in the downward direction 206. In this assembly as shown in FIG. 7, the light is received from the grating coupler 302 on the front side of the optical bench 112 of the optical sub-assembly 104.

Figure 8:
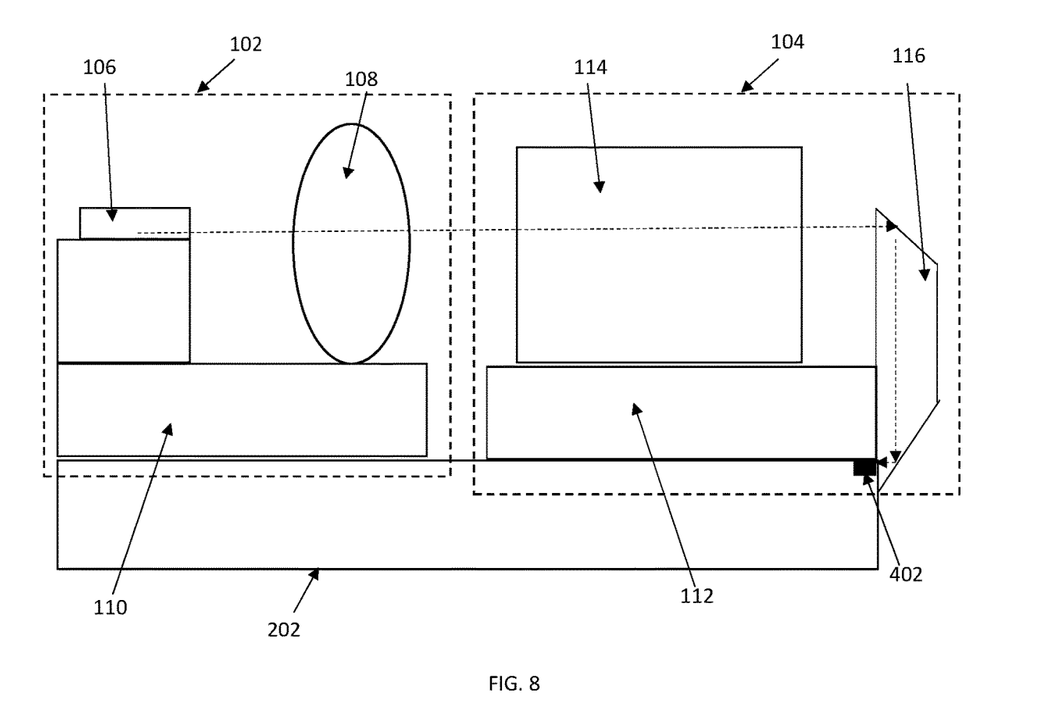
FIG. 8 illustrates a side view of an assembly similar to FIG. 7, but with an edge coupler on the silicon chip, in accordance with an embodiment of the present disclosure.

In an embodiment, the TOSA structure 100 may include an edge coupler 402, as shown in FIG. 8. FIG. 8 illustrates a side view of an assembly similar to the assembly 200 in FIG. 7, but with an edge coupler 402, in accordance with another embodiment of the present disclosure.

Figure 9:
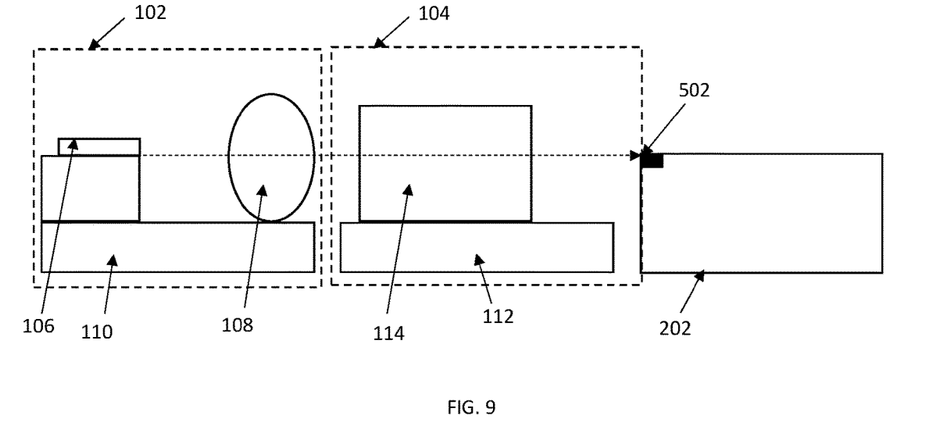
FIG. 9 illustrates a side view of an assembly of a TOSA structure, where both the light source sub-assembly and the optical sub-assembly are assembled beside a silicon chip with an edge coupler on the silicon chip, in accordance with an embodiment of the present disclosure.

In an embodiment, FIG. 9 illustrates a side view of an assembly of the Transmitter Optical Sub-Assembly (TOSA) Structure 100, where both the light source sub-assembly 102 and the optical sub-assembly 104 are assembled beside a silicon chip 202 with an edge coupler 502 on the silicon chip 202. In this assembly as shown in FIG. 9, the light source sub-assembly 102 and the optical sub-assembly 104 are assembled beside the silicon chip 202 and this relative position being beside the silicon chip 202 allows the light received from the edge coupler 502 on the side of the silicon chip 202. It is noted that in the embodiment, the prism is omitted, since the light can directly reach the edge coupler 502.

Figure 10:
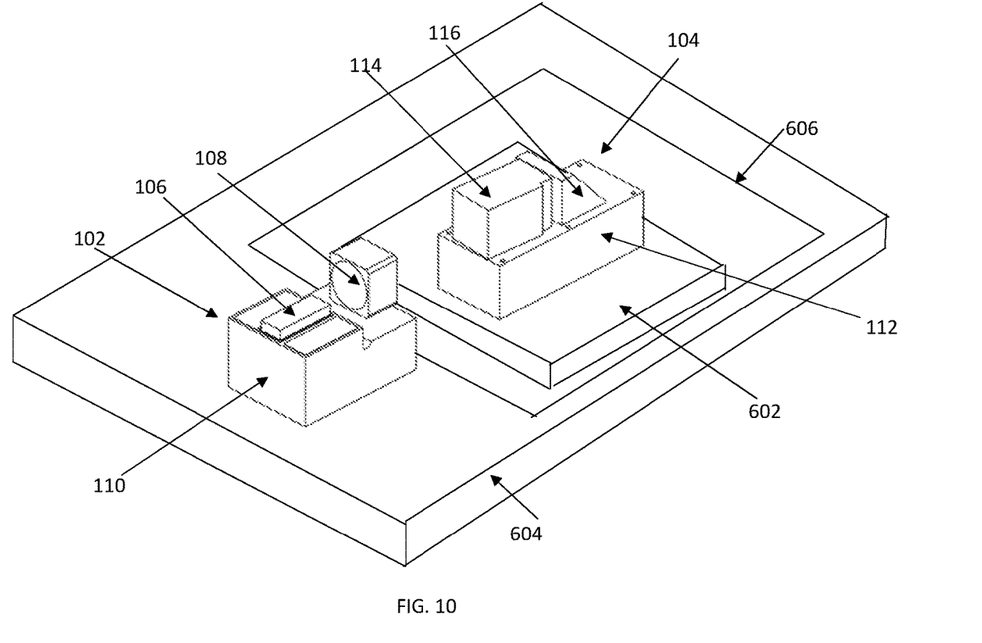
FIG. 10 illustrates an assembly of a TOSA structure, where the optical sub-assembly is individually assembled on a silicon chip, and the light source sub-assembly and the optical sub-assembly with the silicon chip are assembled on an electrical substrate, in accordance with an embodiment of the present disclosure.

FIG. 10 illustrates an assembly of the Transmitter Optical Sub-Assembly (TOSA) Structure 100, where the optical sub-assembly 104 is individually assembled on a silicon chip 602, and then the light source sub-assembly 102 and the optical sub-assembly 104 with the silicon chip 602 are all assembled on an electrical substrate 604, such as a PCB, in accordance with an embodiment of the present disclosure. The silicon chip 602 is embedded in the cavity 606 of the electrical substrate 604. The heat generated in this assembly can get dissipated through the electrical substrate 604.

Figure 11:
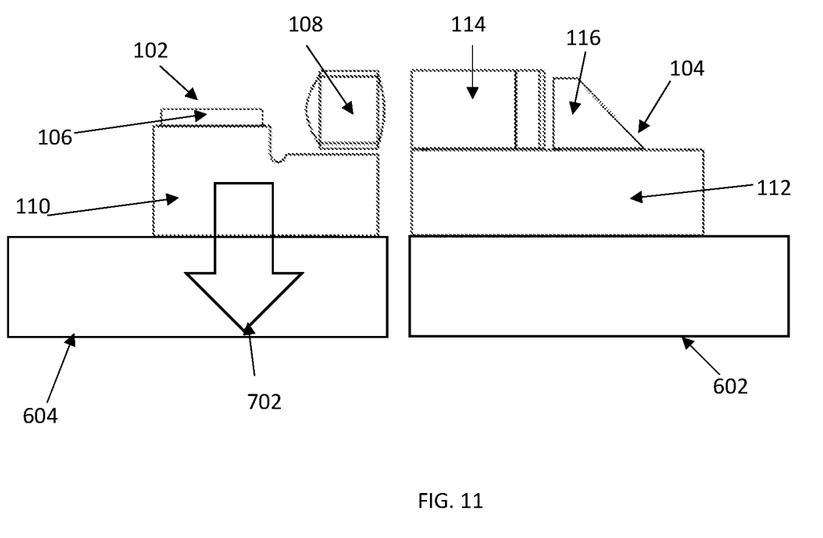
FIG. 11 illustrates an assembly of a TOSA structure, where the light source sub-assembly and the optical sub-assembly are assembled on an electrical substrate and on a silicon chip, respectively, where the thermal transition is provided by the electrical substrate, in accordance with an embodiment of the present disclosure.

FIG. 11 illustrates an assembly of the Transmitter Optical Sub-Assembly (TOSA) Structure 100, where the light source sub-assembly 102 and the optical sub-assembly 104 are assembled on an electrical substrate 604 and on a silicon chip 602, respectively, where the thermal transition is provided by the electrical substrate 604 in the downward direction 702, in accordance with an embodiment of the present disclosure.

Figure 12:
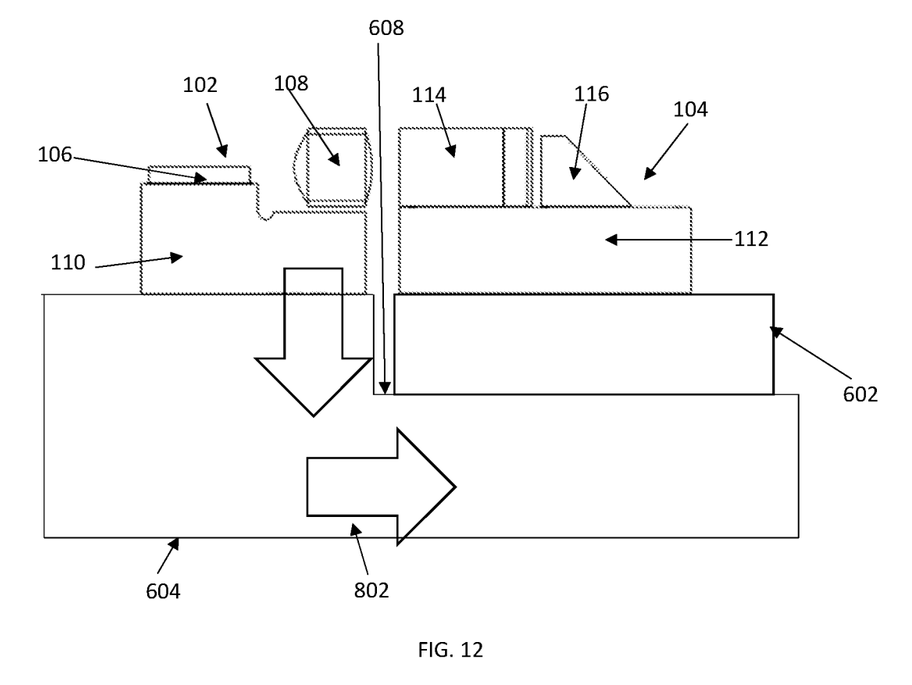
FIG. 12 illustrates a side view of an assembly of a TOSA structure, where the optical sub-assembly is individually assembled on a silicon chip, and the light source sub-assembly and the optical sub-assembly with the silicon chip are assembled on an electrical substrate, where the thermal transition is provided by the electrical substrate and the silicon chip together, in accordance with an embodiment of the present disclosure.

FIG. 12 illustrates a side view of an assembly of the Transmitter Optical Sub-Assembly (TOSA) Structure 100, where the thermal transition is provided by the electrical substrate 604 and the silicon chip 602 together in the thermal transition direction 802, in accordance with an embodiment of the present disclosure. In this assembly as shown in FIG. 12, the silicon chip 602 is assembled on a step 608 of the electrical substrate 604, in accordance with an embodiment of the present disclosure.

Figure 13:
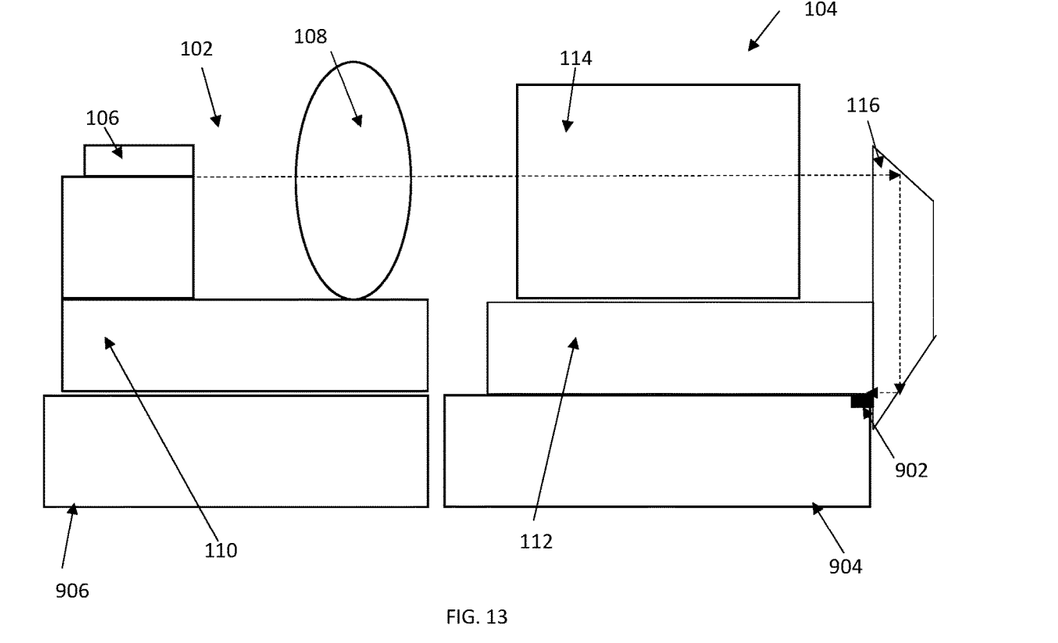
FIG. 13 illustrates a side view of an assembly of a TOSA structure, with an edge coupler on the silicon chip, where the light source sub-assembly and the optical sub-assembly are assembled on an electrical substrate and on a silicon chip, respectively, in accordance with an embodiment of the present disclosure.

FIG. 13 illustrates a side view of an assembly with an edge coupler 902 on the silicon chip 904 on which the optical sub-assembly 104 is separately assembled, in accordance with an embodiment of the present disclosure. The light source sub-assembly 102 is assembled separately on the electrical substrate 906.

Figure 14:
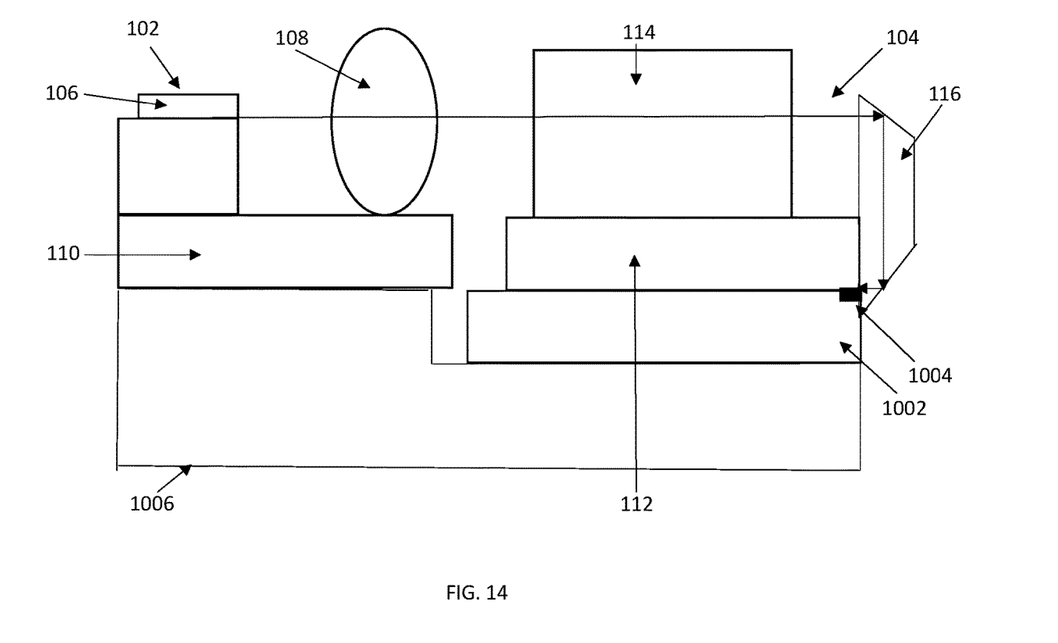
FIG. 14 illustrates a side view of an assembly of a TOSA structure, with an edge coupler on the silicon chip, where the optical sub-assembly is individually assembled on a silicon chip, and the light source sub-assembly and the optical sub-assembly with the silicon chip are assembled on an electrical substrate, in accordance with an embodiment of the present disclosure.

FIG. 14 illustrates a side view of an assembly with an edge coupler 1004 on the silicon chip 1002 on which the optical sub-assembly 104 is assembled, in accordance with an embodiment of the present disclosure. The light source sub-assembly 102 and the optical sub-assembly 104, which is separately assembled on the silicon chip 1002, are all assembled on the electrical substrate 1006.

Figure 15:
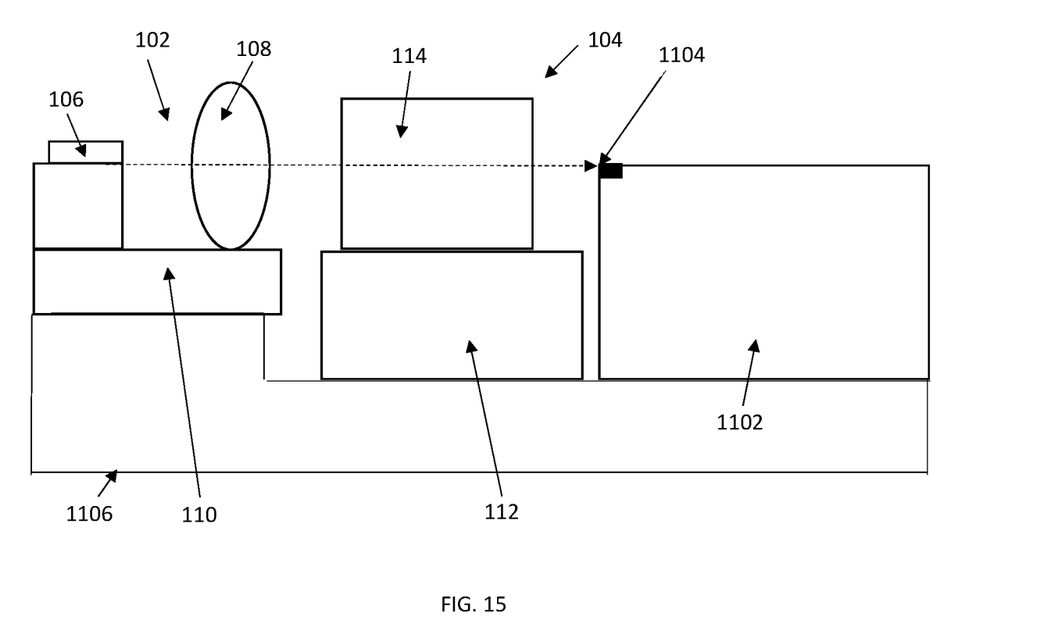
FIG. 15 illustrates a side view of an assembly of a TOSA structure, where both the light source sub-assembly and the optical sub-assembly are assembled beside a silicon chip, with an edge coupler on the silicon chip, and the whole assembly is on an electrical substrate, in accordance with an embodiment of the present disclosure.

Additionally, in FIG. 15, a side view of the assembly of the Transmitter Optical Sub-Assembly (TOSA) Structure 100 is illustrated, where both the light source sub-assembly 102 and the optical sub-assembly 104 are assembled beside a silicon chip 1102, with an edge coupler 1104 on the silicon chip 1102, and then the whole assembly is assembled on an electrical substrate 1106, in accordance with an embodiment of the present disclosure.

Every structure shown in the FIGS. 1-15, includes active alignment of the two sub-assemblies, the light source sub-assembly 102 and the optical sub-assembly 104. The active alignment assembly method includes actively aligning the light source sub-assembly 102 and the optical sub-assembly 104 at the same time. The light source sub-assembly 102 and the optical sub-assembly 104 are either assembled at the same platform or two different platforms, for example, the electrical substrate and the silicon chip. The advantage of assembling at different platforms is the assembly becomes more flexible and saves more space for full assembly. The optical sub-assembly 104 can be embedded inside the cavity of the substrate, in an embodiment. The assembly process is done with active alignment method of both the sub-assemblies, the light source sub-assembly 102 and the optical sub-assembly 104, together, and the alignment standard is to have good coupling power measurement on silicon wafer in time.

It may be apparent to a person skilled in the art that the light source sub-assembly 102 and the optical sub-assembly 104 may include any other required components, including or excluding the ones mentioned above and shown in the drawings, depending on the design and requirements of the TOSA structure, without deviating from the meaning and scope of the present disclosure.

Figure 16:
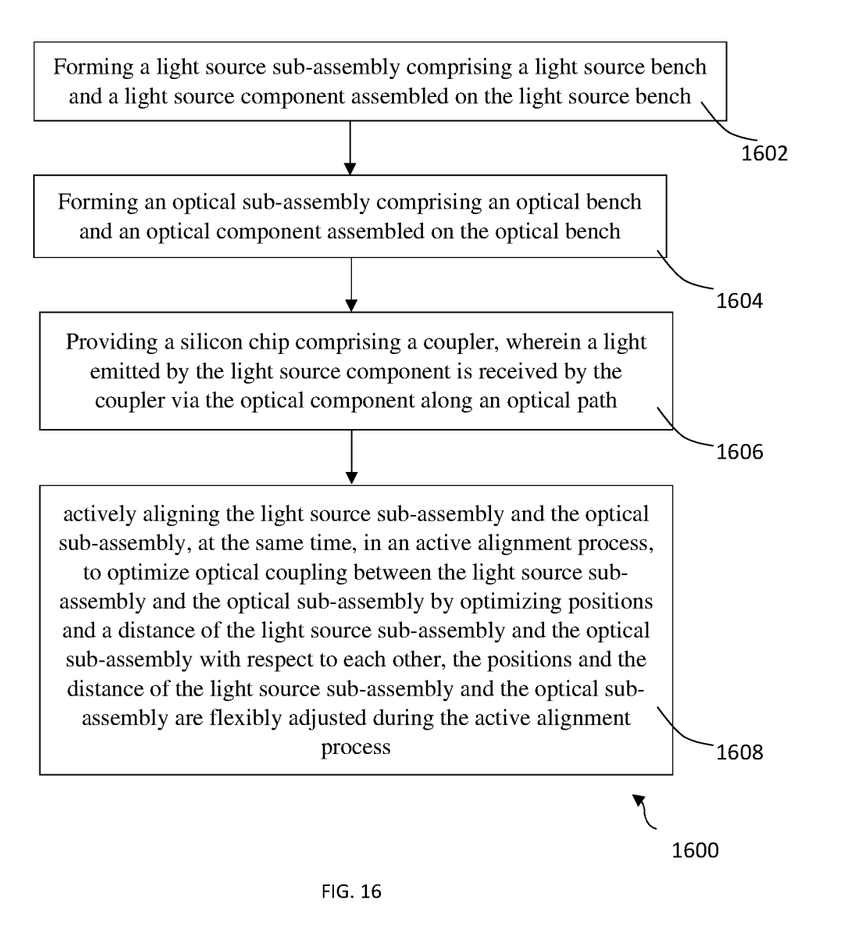
FIG. 16 illustrates an active alignment method of a TOSA structure, in accordance with an embodiment of the present disclosure.

FIG. 16 illustrates an active alignment method 1600 of the Transmitter Optical Sub-Assembly (TOSA) Structure, in accordance with an embodiment of the present disclosure. The method 1600 as shown in the FIG. 16 should be read and understood in conjunction with the FIGS. 1-15, and include at least one or more embodiments of the FIGS. 1-15. The method 1600 as shown in the FIG. 16 should not be limited to the method flow steps 1602-1608, as shown.

Referring to FIG. 16, the method 1600 includes a step 1602 of forming a light source sub-assembly including a light source bench and a light source component assembled on the light source bench. The method 1600 also includes a step 1604 of forming an optical sub-assembly including an optical bench and an optical component assembled on the optical bench. The light source bench and the optical bench being thermally conductive to dissipate, individually or together, heat generated from the light source component.

The light source sub-assembly 102 includes the light source components that may include and not limited to a laser diode 106 emitting one or more optical signals, a laser diode lens 108 positioned in front of the laser diode 106. The laser diode 106 with the laser diode lens 108 is assembled on a light source bench 110. This constitutes as first independent sub-assembly of the TOSA structure 100. The optical sub-assembly 104 includes the optical components assembled on an optical bench 112, the optical components may include and not limited to an isolator 114, and a prism 116 assembled on the optical bench 112. The optical sub-assembly 104 is assembled with particular distance defined from the light source sub-assembly 102; and then assembled as second independent sub-assembly of the TOSA structure 100. The optical bench 112 and the light source bench 110 are thermal conductive friendly, and helps in dissipating heat generated from the laser diode 106. The thermal energy generated when the laser diode 106 is on is passed directly through the light source bench 110, and also to the optical bench 112 (silicon in this case) towards the direction of the light source sub-assembly 102 and the optical sub-assembly 104.

The method 1600 further includes a step 1606 of providing a silicon chip including a coupler, where a light emitted by the light source component is received by the coupler via the optical component along an optical path, and a step 1608 of actively aligning the light source sub-assembly and the optical sub-assembly, at the same time, in an active alignment process, to optimize optical coupling between the light source sub-assembly and the optical sub-assembly by optimizing positions and a distance of the light source sub-assembly and the optical sub-assembly with respect to each other, the positions and the distance of the light source sub-assembly and the optical sub-assembly are flexibly adjusted during the active alignment process. The step 1608 includes operably configuring the laser diode 106 in the light source sub-assembly 102 to actively align into an optical path 118 for optical power coupling with the optical bench 112 as illustrated in FIG. 4. In particular, the laser diode 106 is actively aligned with the optical path 118 by lighting the laser diode 106 and monitoring the optical output power received by the optical bench 112.

The light source sub-assembly 102 and the optical sub-assembly 104, of the TOSA structure 100, can be assembled together by finding the best efficiency of the optical coupling while optimizing the positions of the light source sub-assembly 102 and the optical sub-assembly 104, at the same time.

The light source sub-assembly 102 and the optical sub-assembly 104, are assembled together on a silicon chip, or assembled together beside a silicon chip depending on the fiber-to-chip optical coupling included in the TOSA structure. The fiber-to-chip optical coupling may include and be not limited to grating coupler or edge coupler on silicon wafer. Grating couplers work under off-plane coupling, while edge couplers function as in-plane coupling.

The method as shown in FIG. 16 includes all the design structures and their embodiments of the TOSA structure 100, as shown in the FIGS. 1-15.

Advantageously, the optical coupling keeps flexibility of two sub-assemblies (or parts) alignment while the assembly process is simple and cost efficient. The thermal conductivity is better through this direct method. Light source sub-assembly and optical sub-assembly are separated into two pieces. Optical lens is sitting on top of the lens substrate, which is thermal conductive friendly. The optical coupling is finding the best efficiency while optimizing two sub-assemblies' (or parts) positions at the same time. The thermal energy generated when the laser diode is on is passing directly through a light source bench, to the optical bench (silicon in this case). A good solution of sitting two sub-assemblies (or parts), namely light source sub-assembly and optical sub-assembly on two individual platforms, which promises the high tolerance be compensated by active align process.

The advantage of this "two sub-assemblies (or parts) active alignment" is to save the calculation for putting component(s) on other similar active alignment method, since the distance of these two sub-assemblies can be flexibly adjusted during alignment process.

It is intended that the disclosure and examples be considered as exemplary only. Though the present disclosure includes examples from optical transmissions, the system and method disclosed herein may be employed for various other types of optical transmission systems and methods as would be appreciated by one skilled in the art.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

What is claimed is:

1. A transmitter optical sub-assembly structure, comprising:
    a light source sub-assembly comprising a light source bench, a laser diode, and a laser diode lens positioned downstream of the laser diode along an optical path, wherein the laser diode and the laser diode lens are assembled on the light source bench; and
    an optical sub-assembly comprising an optical bench, an isolator, and a prism positioned downstream of the isolator along the optical path,
        wherein the isolator and the prism are assembled on the optical bench; and
    a silicon chip comprising a coupler,
        wherein a light emitted by the laser diode is received by the coupler via the isolator along the optical path,
        wherein the light source bench and the optical bench are thermally conductive to dissipate, individually or together, heat generated from the laser diode,
        wherein the light source bench and the optical bench are disposed adjacent to each other along a same axis,
        wherein the light source sub-assembly, as a whole sub-assembly, and the optical sub-assembly, as another whole sub-assembly, are aligned to optimize optical coupling between the light source sub-assembly and the optical sub-assembly by optimizing positions of the light source sub-assembly and the optical sub-assembly, and a distance between the light source sub-assembly and the optical sub-assembly with respect to each other,
        wherein the laser diode lens of the light source sub-assembly is configured to be located between the laser diode of the light source sub-assembly and the isolator of the optical sub-assembly,
        wherein the positions of the light source sub-assembly and the optical sub-assembly, and the distance between the light source sub-assembly and the optical sub-assembly, are adjusted by lighting the laser diode and monitoring optical output power received by the optical bench,
        wherein the positions of the light source sub-assembly and the optical sub-assembly, and the distance between the light source sub-assembly and the optical sub-assembly are configured for maximal optical output power, and
        wherein a distance between the laser diode and the laser diode lens stays the same during the alignment.

2. The transmitter optical sub-assembly structure of claim 1, wherein the light source sub-assembly and the optical sub-assembly are both positioned beside the silicon chip.

3. The transmitter optical sub-assembly structure of claim 2, wherein the light source sub-assembly, the optical sub-assembly, and the silicon chip are all assembled on an electrical substrate.

4. The transmitter optical sub-assembly structure of claim 1, wherein the light source sub-assembly and the optical sub-assembly are both assembled on the silicon chip.

5. The transmitter optical sub-assembly structure of claim 1, wherein the optical sub-assembly is assembled on the silicon chip, and the light source sub-assembly is assembled on an electrical substrate that is positioned beside the silicon chip.

6. The transmitter optical sub-assembly structure of claim 1, wherein the optical sub-assembly is assembled on the silicon chip, and
    wherein the silicon chip and the light source sub-assembly are assembled on an electrical substrate.

7. The transmitter optical sub-assembly structure of claim 6, wherein the silicon chip is assembled in a cavity of the electrical substrate.

8. The transmitter optical sub-assembly structure of claim 6, wherein the silicon chip is assembled on a step of the electrical substrate.

9. A transmitter optical sub-assembly structure, comprising:
- a light source sub-assembly comprising a light source bench, a laser diode, and a laser diode lens positioned downstream of the laser diode along an optical path, wherein the laser diode and the laser diode lens are assembled on the light source bench;
- an optical sub-assembly comprising an optical bench; and
- a silicon chip comprising a coupler, and supporting at least one of the light source sub-assembly and the optical sub-assembly,
  - wherein the light source bench and the optical bench are thermally conductive to dissipate, individually or together, heat generated from the laser diode,
  - wherein the light source bench and the optical bench are disposed adjacent to each other,
  - wherein the light source sub-assembly, as a whole sub-assembly, and the optical sub-assembly, as another whole subassembly, are aligned with the laser diode lens of the light source sub-assembly located between the laser diode of the light source sub-assembly and the optical sub-assembly, to optimize optical coupling between the light source sub-assembly and the optical sub-assembly,
  - wherein positions of the light source sub-assembly and the optical sub-assembly, and a distance between the light source sub-assembly and the optical sub-assembly, are configured for maximal optical output power, and
  - wherein a distance between the laser diode and the laser diode lens stays the same during the alignment.

10. The transmitter optical sub-assembly structure of claim 9, wherein the optical sub-assembly further comprises an isolator and a prism positioned downstream of the isolator along the optical path,
  wherein the isolator and the prism are assembled on the optical bench.

11. The transmitter optical sub-assembly structure of claim 9, wherein the silicon chip supports the light source sub-assembly and the optical sub-assembly.

12. The transmitter optical sub-assembly structure of claim 9, further comprising:
  an electrical substrate that supports the silicon chip.

13. The transmitter optical sub-assembly structure of claim 12, wherein the silicon chip is located in a cavity or on a step of the electrical substrate.

14. The transmitter optical sub-assembly structure of claim 1, wherein the coupler is a grating coupler or an edge coupler, and
  wherein the grating coupler is associated with off-plane coupling and the edge coupler is associated with in-plane coupling.

15. A method, comprising:
  forming a light source sub-assembly comprising a light source bench, a laser diode, and a laser diode lens positioned downstream of the laser diode along an optical path,
    wherein the laser diode and the laser diode lens are assembled on the light source bench; and
  forming an optical sub-assembly comprising an optical bench, an isolator, and a prism positioned downstream of the isolator along the optical path,
    wherein the isolator and the prism are assembled on the optical bench; and
  a silicon chip comprising a coupler,
    wherein a light emitted by the laser diode is received by the coupler via the isolator along the optical path,
    wherein the light source bench and the optical bench are thermally conductive to dissipate, individually or together, heat generated from the laser diode, and
    wherein the light source bench and the optical bench are disposed adjacent to each other along a same axis,
  aligning the light source sub-assembly, as a whole sub-assembly, and the optical sub-assembly, as another whole sub-assembly, to optimize optical coupling between the light source sub-assembly and the optical sub-assembly by optimizing positions of the light source sub-assembly and the optical sub-assembly, and a distance between the light source sub-assembly and the optical sub-assembly with respect to each other,
    wherein the laser diode lens of the light source sub-assembly is located between the laser diode of the light source sub-assembly and the isolator of the optical sub-assembly,
    wherein the positions of the light source sub-assembly and the optical sub-assembly, and the distance between the light source sub-assembly and the optical sub-assembly, are adjusted by lighting the laser diode and monitoring optical output power received by the optical bench,
    wherein the positions of the light source sub-assembly and the optical sub-assembly, and the distance between the light source sub-assembly and the optical sub-assembly, are configured for maximal optical output power, and
    wherein a distance between the laser diode and the laser diode lens stays the same during the alignment.

16. The method of claim 15, wherein a position of the light source sub-assembly is adjusted as a whole unit, and a position of the optical sub-assembly is adjusted as another whole unit during the alignment.

17. The method of claim 15, wherein the light source sub-assembly and the optical sub-assembly are both positioned beside the silicon chip.

18. The method of claim 17, wherein the light source sub-assembly, the optical sub-assembly, and the silicon chip are all assembled on an electrical substrate.

19. The method of claim 15, wherein the light source sub-assembly and the optical sub-assembly are both positioned above the silicon chip.

20. The method of claim 15, wherein the optical sub-assembly is assembled on the silicon chip, and the light source sub-assembly is assembled on an electrical substrate that is positioned beside the silicon chip.

* * * * *